US010902190B1

(12) United States Patent
Ayloo

(10) Patent No.: US 10,902,190 B1
(45) Date of Patent: Jan. 26, 2021

(54) POPULATING ELECTRONIC MESSAGES WITH QUOTES

(71) Applicant: Microsoft Technology Licensing, LLC, Redmond, WA (US)

(72) Inventor: Kalyan Ayloo, Redmond, WA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 0 days.

(21) Appl. No.: 16/503,058

(22) Filed: Jul. 3, 2019

(51) Int. Cl.
*G06F 17/00* (2019.01)
*G06F 40/166* (2020.01)
*G06F 3/0481* (2013.01)
*H04L 12/58* (2006.01)

(52) U.S. Cl.
CPC .......... *G06F 40/166* (2020.01); *G06F 3/0481* (2013.01); *H04L 51/16* (2013.01)

(58) Field of Classification Search
CPC ....... H04L 51/16; G06F 40/166; G06F 3/0481
See application file for complete search history.

(56) References Cited

U.S. PATENT DOCUMENTS

| | | | |
|---|---|---|---|
| 7,269,621 B2 | 9/2007 | Chang et al. | |
| 7,693,940 B2 * | 4/2010 | Carmel | G06F 40/35 709/203 |
| 8,036,989 B2 * | 10/2011 | Kircher | G06Q 10/107 705/51 |
| 9,256,889 B1 * | 2/2016 | Yun | G06F 40/189 |
| 9,426,102 B1 * | 8/2016 | Wong | H04L 51/02 |
| 9,699,298 B2 * | 7/2017 | Rubinstein | H04M 1/72552 |
| 2003/0182310 A1 * | 9/2003 | Charnock | G06Q 10/10 |
| 2007/0300159 A1 * | 12/2007 | Kordun | G06Q 10/10 715/733 |
| 2011/0295593 A1 * | 12/2011 | Raghuveer | G06Q 10/10 704/9 |
| 2012/0011453 A1 * | 1/2012 | Shimono | H04L 51/10 715/753 |
| 2013/0218896 A1 * | 8/2013 | Palay | G06F 16/22 707/741 |
| 2013/0227439 A1 * | 8/2013 | Shin | G06Q 50/01 715/758 |

(Continued)

OTHER PUBLICATIONS

Reply to an Email Quoting Highlighted Text, Retrieved from: https://gsuitetips.com/tips/gmail/reply-to-an-email-quoting-highlighted-text/, Retrieved Date: May 10, 2019, 3 Pages.

(Continued)

*Primary Examiner* — Laurie A Ries

(57) ABSTRACT

Techniques for populating a response electronic message with one or more quotes are disclosed, where the quote(s) are obtained from a received electronic message. In one example, a quote is automatically detected in the received electronic message and inserted into the response electronic message as a suggested quote. Additionally or alternatively, a character input that indicates an intent to insert a quote into the response electronic message is received. A text input is then received, where the text input includes at least a portion of the text in the received electronic communication that constitutes the quote. Based on the text input, the quote in the received electronic message is determined and the response electronic communication is populated with the quote.

20 Claims, 16 Drawing Sheets

(56) References Cited

U.S. PATENT DOCUMENTS

| | | | | |
|---|---|---|---|---|
| 2013/0290435 | A1* | 10/2013 | Martin | H04L 51/28 709/206 |
| 2014/0040256 | A1* | 2/2014 | White-Sullivan | G06F 16/435 707/734 |
| 2015/0100356 | A1* | 4/2015 | Bessler | G06Q 30/01 705/7.12 |
| 2016/0080303 | A1* | 3/2016 | Deolalikar | G06Q 10/107 709/206 |
| 2017/0154539 | A1* | 6/2017 | King | G06N 20/20 |
| 2017/0180294 | A1* | 6/2017 | Milligan | H04L 51/02 |
| 2017/0199657 | A1* | 7/2017 | Mullins | G06F 40/197 |
| 2017/0201471 | A1 | 7/2017 | Miklos et al. | |
| 2017/0235848 | A1* | 8/2017 | Van Dusen | G06F 16/904 705/12 |
| 2017/0286366 | A1* | 10/2017 | Chang | G06F 40/103 |
| 2018/0219823 | A1 | 8/2018 | Mohan | |
| 2018/0253659 | A1* | 9/2018 | Lee | G06N 20/00 |
| 2019/0297034 | A1* | 9/2019 | Gupta | H04L 51/04 |
| 2020/0042561 | A1* | 2/2020 | Yehaskel | H04L 51/046 |
| 2020/0274844 | A1* | 8/2020 | Zhao | H04L 51/16 |

OTHER PUBLICATIONS

Reply with inline comments within the original message text, Retrieved from: https://support.office.com/en-us/article/reply-with-inline-comments-within-the-original-message-text-5bc44105-aeb2-49e2-8239-5aeeff52e5a7, Retrieved Date: May 10, 2019, 4 Pages.

Replying to a specific message and have the message quoted, Retrieved from: https://github.com/signalapp/Signal-Android/issues/6017, Retrieved Date: May 10, 2019, 6 Pages.

Lenser, Paul, "Send Responses on Social in a Breeze Using Sprout Social's Saved Replies", Retrieved from: https://sproutsocial.com/insights/saved-replies/, Mar. 22, 2018, 4 Pages.

How to Use Abbreviations For Fast and Error-Free Typing Of Organization And Person Names, Retrieved From: https://web.archive.org/web/20170905180756/http://www.officetooltips.com:80/word_2016/tips/how_to_use_abbreviations_for_fast_and_error-free_typing_of_organization_and_person_names.html, Sep. 5, 2017, 3 Pages.

International Search Report and Written Opinion Issued in PCT Application No. PCT/US20/033006, dated Jul. 2, 2020, 12 Pages.

* cited by examiner

700B

| | REPLY | REPLY ALL | FORWARD | DELETE |

| SEND | TO | TOM@COMPANY.COM |
| | CC | |
| | SUBJECT | FWD: MEETING |

701 {
| *What did you think of the presentation?* ← 708

I thought the presentation went well.  Next time we should focus on Project X more.  ← 710

Jane

| REPLY | REPLY ALL | FORWARD | DELETE |

| SEND | TO | TOM@COMPANY.COM |
| | CC | |
| | SUBJECT | RE: BEST PHRASES |

Here are my suggestions for best phrase.

- *Made in the shade* ← 802
- *Far out* ← 804
- *Can you dig it?* ← 806

| REPLY | REPLY ALL | FORWARD | DELETE |

| SEND | TO | JANE@COMPANY.COM |
| | CC | |
| | SUBJECT | RE: BEST PHRASES |

Here are my suggestions for best phrase.

- *Made in the shade*   I like this – it is from the 1950s ← 810
- *Far out*   Not wild about the 1960s so 3$^{rd}$ place ← 812
- *Can you dig it?*   Fun! From the good old 1970s ← 814

*FIG. 8B*

POPULATING ELECTRONIC MESSAGES WITH QUOTES

BACKGROUND

Electronic communication applications or services allow users to send and receive electronic messages over local and distributed networks, such as the Internet. One example of an electronic communication application is an electronic mail (email) application. Email services are provided by a software application installed on a user's computer, by cloud service, and/or by an Internet-based service.

In some situations, a recipient of an electronic message would like to include a quote from a received electronic message when sending a response to the received electronic message. For example, if the received electronic message is long and/or discusses several subjects that are associated with different people, the recipient may want to quote the portion of the received electronic message that is associated with the recipient. The recipient can then provide comments or a response that corresponds to the quote. Including the quote in the response electronic message can assist the recipients of the response electronic message to correlate the response with the quoted portion, which may help the recipients better understand the response.

Often, the recipient drafting the response electronic message must manually enter the quote into the response electronic message, which is inefficient and tedious. In some situations, the recipient drafting the response electronic message may forego the quote because the recipient does not want to manually enter the quote into the response electronic message.

It is with respect to these and other general considerations that embodiments have been described. Also, although relatively specific problems have been discussed, it should be understood that the embodiments should not be limited to solving the specific problems identified in the background.

SUMMARY

Embodiments disclosed herein provide methods and systems for populating a response electronic message with one or more quotes from a received electronic message. In one aspect, a computer-implemented method of populating a response electronic message with a quote from a received electronic message includes receiving an indication to send the response electronic message to the received electronic message and automatically detecting quotable text in the received electronic message. The response electronic message is populated with the quotable text, where the quotable text presented as a suggested quote. A determination is made as to whether the suggested quote in the response electronic message is finalized or removed based on a received input associated with the suggested quote. Based on a received acceptance input associated with the suggested quote, the suggested quote is finalized in the response electronic message. Based on a received rejection input associated with the suggested quote, the suggested quote is removed from the response electronic message.

In another aspect, a system includes a processing device and a memory operably connected to the processing device. The memory stores instructions, that when executed by the processing device, cause the system to perform operations. The operations include receiving an indication to send the response electronic message to the received electronic message and automatically detecting quotable text in the received electronic message. The response electronic message is populated with the quotable text, where the quotable text is presented as a suggested quote. Based on a received acceptance input associated with the suggested quote, the suggested quote is finalized in the response electronic message. Based on a received rejection input associated with the suggested quote, the suggested quote is removed from the response electronic message.

In yet another aspect, a computer-implemented method includes receiving an indication to send a response electronic message. In response to receiving the indication, quotable text in a received electronic message is automatically detected. For example, one or more machine learning algorithms and/or one or more rule-based machine learning algorithms can be used to automatically detect the quotable text. The response electronic message is populated with the quotable text, where the quotable text is presented as a suggested quote. When a character input indicating an intent to populate the response electronic communication with a quote is not received, the suggested quote is finalized in the response electronic message. Based on receiving the character input that indicates the intent to insert a quote, the suggested quote is removed from the response electronic message and a text input is received, where the text input comprises at least a portion of the text in the received electronic message that constitutes the quote. The quote in the received electronic message that corresponds to the text input is determined and the response electronic message is populated with the quote.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures. The elements of the drawings are not necessarily to scale relative to each other. Identical reference numerals have been used, where possible, to designate identical features that are common to the figures.

FIG. 7B illustrates the second example response electronic mail message that is populated with an inserted quote;

FIG. 8A depicts an example first response electronic mail message populated with multiple suggested quotes;

FIG. 8B illustrates an example second response electronic mail message to the first response electronic mail message shown in FIG. 8A;

DETAILED DESCRIPTION

Figure 1:
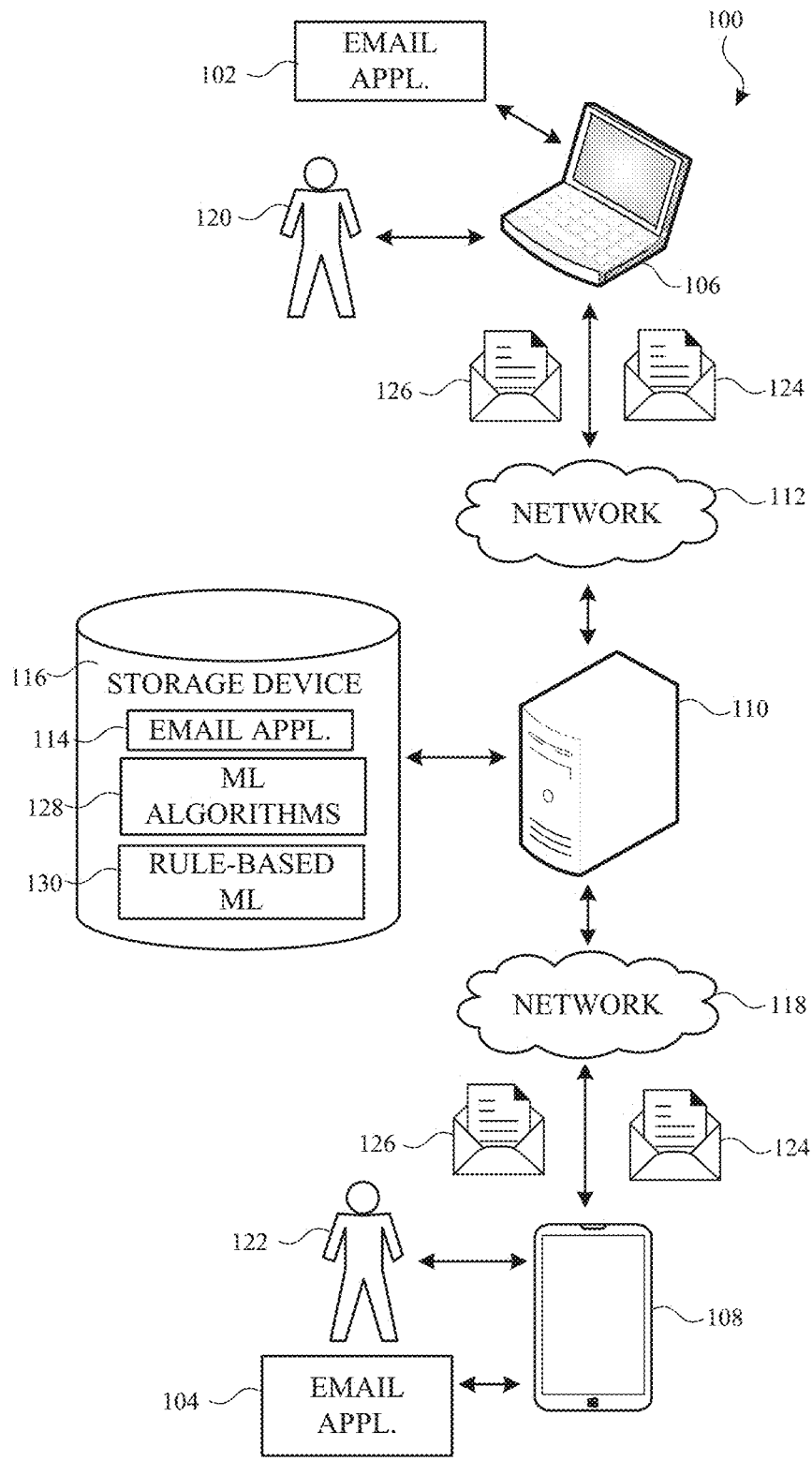
FIG. 1 illustrates an example system in which electronic messages are sent and received.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Embodiments described herein provide techniques for populating a response electronic message with one or more quotes. The quote(s) are obtained from a received electronic message. In one embodiment, the one or more quotes are automatically detected in the received electronic message and inserted into the response electronic message as a suggested quote or quotes. In another example embodiment, a character input that indicates an intent to insert a quote into the response electronic message is received. A text input is then received, where the text input includes at least a portion of the text in the received electronic communication that constitutes the quote. Based on the text input, the quote in the received electronic message is determined and the response electronic communication is populated with the quote.

Non-limiting and non-exhaustive examples are described with reference to the following FIGS. 1-12. The elements of the drawings are not necessarily to scale relative to each other. Identical reference numerals have been used, where possible, to designate identical features that are common to the figures.

FIG. 1 illustrates an example system in which electronic messages are sent and received. FIG. 1 is described in conjunction with sending and receiving electronic mail (email) messages, although other embodiments are not limited to this implementation. For example, the electronic messages may be instant messages, group chat messages, social media messages, or text messages.

The system 100 transmits electronic mail (email) messages between email applications 102, 104 running on client-computing devices 106, 108, respectively. The client-computing device 106 is configured to access one or more server-computing devices (represented by server-computing device 110) through one or more networks (represented by network 112) to interact with an email application 114 stored on one or more storage devices (represented by storage device 116) and executed on the server-computing device 110. Similarly, the client-computing device 108 is configured to access the server-computing device 110 through one or more networks (represented by network 118) to interact with the email application 114.

When the user 120 ("sender") wants to send an email message to the user 122 ("recipient"), the sender 120 generates the email message 124 on the client-computing device 106 using the email application 102. The email application 102 transmits the email message 124 (via the client-computing device 106) to the server-computing device 110 using the network 112. The email application 114 stores a copy of the email message 124 on the storage device 116 and transmits the email message 124 (via the server-computing device 110) to the client-computing device 108 using the network 118. The recipient 122 can view the email message 124 on the client-computing device 108 using the email application 104.

The recipient 122 may generate a response email message 126 using the email application 104. As will be discussed in more detail later, the response email message 126 can be populated with one or more quotes from the email message 124. The email application 104 transmits the response email message 126 to the client-computing device 106 (via the network 118, the server-computing device 110, and the network 112). The sender (now recipient) may view the email message 126 on the client-computing device 106 using the email application 102.

The storage device 116 can also store one or more machine learning (ML) algorithms 128. The ML algorithm(s) 128 are used to analyze the content of the email message 124 to determine if the email message 124 includes one or more possible quotes that can be suggested and/or included in the response email message 126. In a non-limiting example, the ML algorithm(s) 128 analyzes the content of the email message 124 to determine if the email message 124 includes one or more quotes that can be automatically inserted into the response email message 126 as suggested quote(s) when the recipient is creating a reply email message.

The one or more ML algorithms 128 are initially trained using email messages associated with thousands of users. The training process allows the ML algorithm(s) 128 to learn over time what data to consider and not consider when determining text in an email message that comprises quotable text (e.g., a suggested quote). Once in use, the one or more ML algorithms 128 continue to learn based on a user's acceptances and rejections of suggested quotes. Additionally, in some embodiments, the ML algorithms continue to learn based on the interactions of a community of users (e.g., an enterprise, a nation, and/or global).

Additionally or alternatively, the storage device 116 can store one or more rule-based ML algorithms 130. Like the ML algorithms 128, the rule-based ML algorithm(s) 130 are used to analyze the content of the email message 124 to determine one or more quotes that can be presented to the recipient 122 when the recipient 122 is drafting the response email message 126. One example of a rule-based ML algorithm is a learning classifier system that includes a set of context-dependent rules that collectively store and apply knowledge to make predictions. Similar to the ML algorithms 128, the rule-based ML algorithm(s) 130 is initially trained using email messages associated with thousands of users. The training process allows the rule-based ML algorithm(s) 130 to learn and improve the application of the rules over time when determining if the text in an email message comprises quotable text (e.g., a suggested quote).

In one or more embodiments, each network 112, 118 is illustrative of any suitable type of network, for example, an intranet, and/or a distributed computing network (e.g., the Internet) over which the users 120, 122 may communicate with each other and with other computing systems. Additionally, each client-computing device 106, 108 can be a personal or handheld computing device. For example, the client-computing device 106, 108 may be one of: a mobile telephone; a smart phone; a tablet; a smart watch; a wearable computer; a personal computer; a desktop computer; a laptop computer; a gaming device/computer (e.g., Xbox); a television; and the like. This list of client-computing devices is for example purposes only and should not be considered as limiting. Any suitable client-computing device that provides and/or interacts with one or more email applications and provide one or more suggested quotes in a response email message that is obtained from a received email message may employ aspects of the disclosure.

As should be appreciated, FIG. 1 is described for purposes of illustrating the present methods and systems and is not intended to limit the disclosure to a particular sequence of steps or a particular combination of hardware or software components. Additionally, embodiments are not limited to two client-computing devices 106, 108, one server-computing device 110, two networks 112, 118, and a storage device 116. The system 100 can include any suitable number of server-computing devices, networks, client-computing devices, and/or storage devices.

Figure 2A:
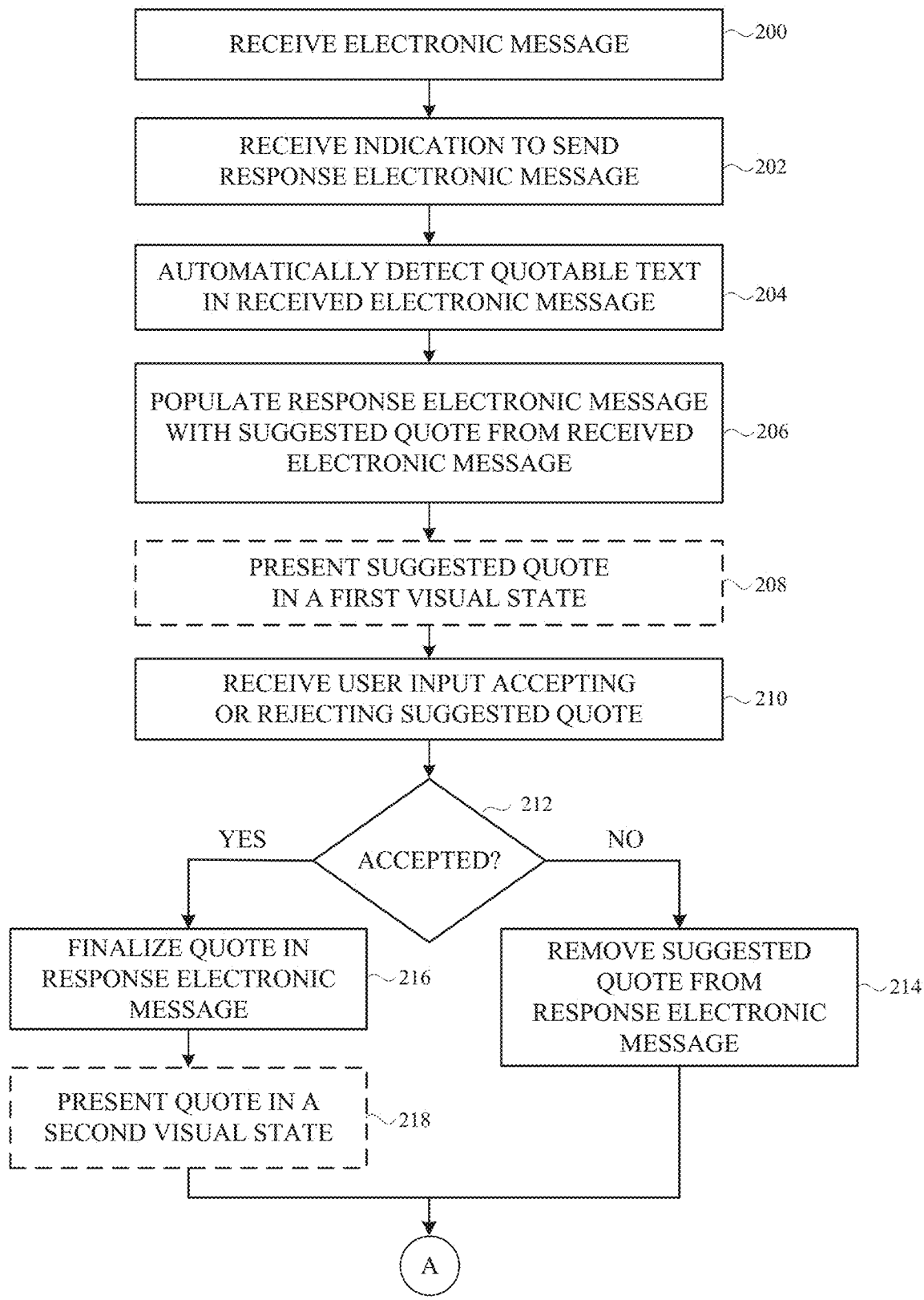
FIGS. 2A-2B depict a flowchart of a first example method of populating response electronic messages with one or more quotes.
Figure 2B:
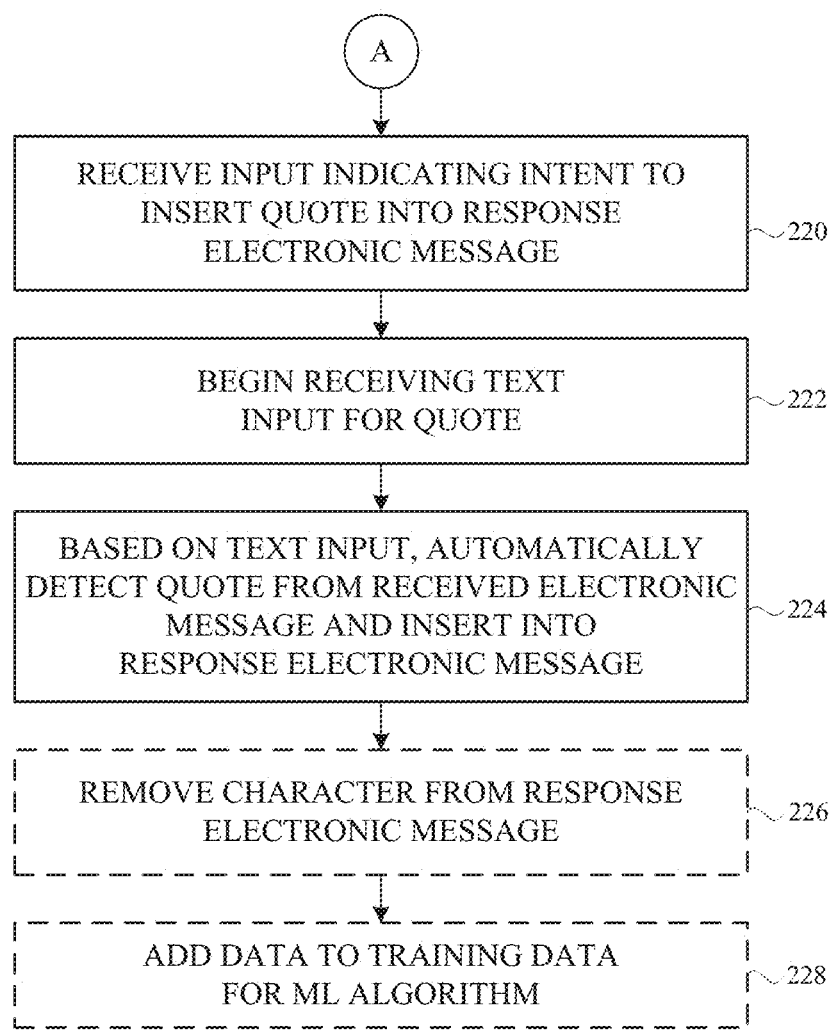

FIGS. 2A-2B depict a flowchart of a first example method of populating response electronic messages with one or more quotes. The first example method is described in conjunction with a single quote, although other embodiments are not limited to this implementation. An electronic message can be populated with one or more quotes in other embodiments.

Initially, an electronic message is received at block 200. As previously described, the electronic message can be an email message, an instant message, a group chat message, a social media message, a text message, or other electronic message. At block 202, an indication to send a response electronic message is received. In some embodiments, the indication can be a selection of a menu option provided in a user interface of an electronic message application, a selection of a text entry box, a text input to a text entry box, a selection of a graphical element, a gesture or a shortcut, and the like. In a non-limiting example, the response electronic message is a reply electronic message, a reply to all electronic message, or a forwarded message.

In response to receiving the indication to send a response electronic message, quotable text is automatically detected in the received electronic message (block 204). The response electronic message is then populated with a suggested quote from the received electronic message, where the suggested quote is the detected quotable text (block 206). The automatic detection of the quote is performed without user input or interaction. Additionally, the population of the response electronic message with the suggested quote can be automatic as well (performed without user intervention). In some embodiments, the automatic detection and/or the automatic population are performed using one or more machine learning (ML) algorithms. Additionally or alternatively, the automatic detection and/or the automatic population are performed using one or more rule-based ML algorithms.

The suggested quote can be presented in the response electronic message in a first visual state (block 208). In one aspect, the first visual state of the suggested quote can be a visual state that differs from the visual state of the other text in the response electronic message. For example, the suggest quote can be italicized, highlighted by underlining or a box, greyed out, indented with a bullet point, positioned under a heading or a topic, preceded or followed by the word or words "Suggested Quote" or "Quoting", and/or have a different sized font. The first visual state can indicate to a user that the quote is a suggested quote that the user can chose to accept or reject. Block 208 is optional and can be omitted in other embodiments.

Next, as shown in block 210, a user input accepting or rejecting the suggested quote is received. Any suitable user input can be used. In a non-limiting example, an acceptance input accepting the suggested quote is a particular first character input and a rejection input rejecting the suggested quote is a different second character input. An example acceptance input is a selection of a TAB keyboard key and an example rejection input is a selection of an ESC keyboard key. Other types of acceptance and rejection inputs can be used in other embodiments. For example, selections of menu options or gestures can be used for an acceptance input and a rejection input.

A determination is made at block 212 as to whether the suggested quote is accepted. The suggested quote may be accepted based on the receipt of an acceptance input. In non-limiting examples, the acceptance input can be the input of a particular character, such as a selection of the TAB keyboard key, an input of a gesture, or a selection of a menu option. If the suggested quote is rejected, the process passes to block 214 where the suggested quote is removed from the response electronic message. The suggested quote may be rejected based on the receipt of a rejection input. In non-limiting examples, the rejection input can be the input of a particular character, such as a selection of the escape (ESC) keyboard key, an input of a gesture, or a selection of a menu option.

When the suggested quote is accepted, the process passes to block 216 where the suggested quote is finalized in the response electronic message. Finalizing the suggested quote includes maintaining the quote in the response electronic message. In some aspects, finalizing the quote may also include presenting the quote in a second visual state that differs from the first visual state (block 218). In one aspect, the second visual state of the finalized quote can be a visual state that differs from the visual state of the other text in the response electronic message. For example, the quote can transition from italicized to non-italicized text, any underlining or highlighting of the quote can be removed, and/or the greyed out text can be replaced with text that matches the color of the other text in the body of the response electronic message (e.g., black) or that presents the quote in a particular color, font, and/or format (e.g., red and/or bold). In some embodiments, a user can select the first and the second visual states. For example, user settings or preferences can be used to select the first and the second visual states. Block 218 is optional and can be omitted in other embodiments.

The method continues at block 220 after the performance of block 214, block 216 (in embodiments where block 218 is omitted), or block 218. At block 220, an input indicating an intent to insert a quote into the response electronic message is received. Any suitable input can be used. For example, one or more particular characters and/or special characters may be entered into the body of the response electronic message. Example characters and special characters include, but are not limited to, a pipe (|), a caret (^), a capitalized letter Q, a quote mark ("), and two consecutive plus signs (++). In another example, a shortcut, a menu selection, or a gesture can be used to indicate the intent to insert a quote into the response electronic message.

After the input indicating the intent to insert the quote is received, the user can begin entering text that corresponds to the quote. As such, a text input is received at block 222. The received text input is used to automatically detect the corresponding text (the quote) in the received electronic message and the quote is inserted into the response electronic message (block 224). In one aspect, the inserted quote is presented in a visual state that differs from the other text in the body of the response electronic message, although this is not required.

In some embodiments, the one or more characters or special characters that was entered in the body of the response electronic message to indicate the intent to insert the quote can be removed from the response electronic message at block 226 (leaving just the inserted quote). Block 226 is optional and may be omitted in other embodiments.

Next, as shown in block 228, the suggested quote, the acceptance or rejection of the suggested quote, and/or the text input and the corresponding quote can be added to the training data for the one or more ML algorithms. The ML algorithm(s) continue to "learn" when data associated with the user's behavior is including in the training data. Block 228 is optional and may be omitted in other embodiments.

In one example implementation, one or more quotes are automatically detected and populated in a response electronic message (e.g., only blocks 200-218 and optionally block 228 are performed). In another example embodiment, a response electronic message is populated with an inserted quote in response to receiving the character input that indicates the intent to insert a quote and the text input (e.g., only blocks 220-226 and optionally block 228 are performed). In other embodiments, both processes are performed in that one or more suggested quotes is automatically detected and populated in a response electronic message and one or more inserted quotes is included in the response electronic communication.

Figure 3:
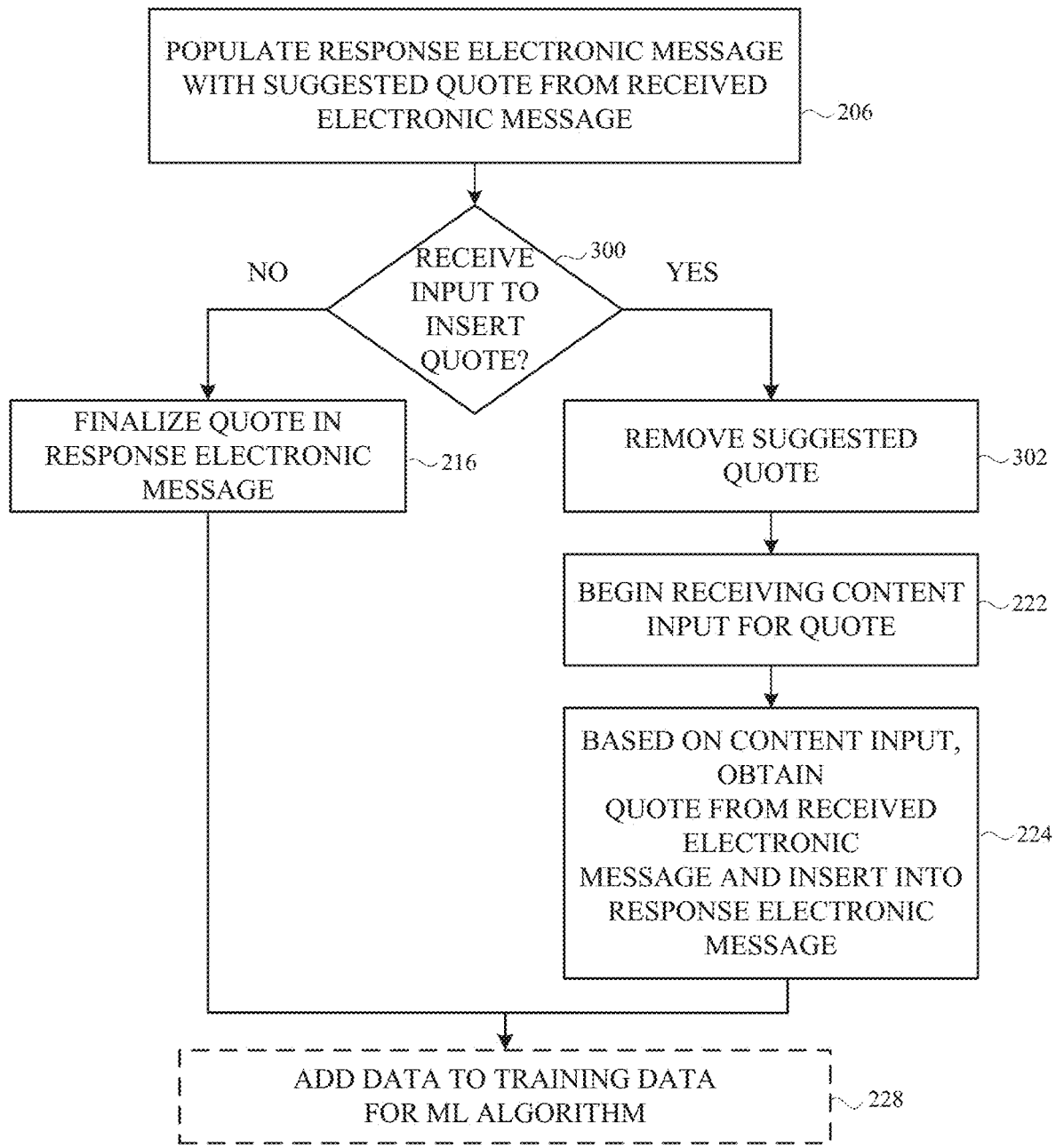
FIG. 3 illustrates a flowchart of a second example method of populating response electronic messages with one or more quotes.

FIG. 3 illustrates a flowchart of a second example method of populating response electronic messages with one or more quotes. Many of the blocks shown in FIG. 3 are the same blocks depicted in FIGS. 2A-2B. As such, the same reference numbers are used in FIG. 3, and for brevity, these blocks are not be described in detail in conjunction with FIG. 3.

Although the process shown in FIG. 3 begins with block 206, the blocks 200, 202, and 204 can be performed before block 206. At block 206, the response electronic message is populated with the suggested quote. In some embodiments, the suggested quote can be presented in the response electronic message in a first visual state (block 208 in FIG. 2A).

A determination is made at block 300 as to whether an input indicating an intent to insert a quote in the response electronic message is received. If not, the suggested quote is automatically accepted and finalized in the response electronic message (block 216). In some embodiments, the finalized quote can be presented in the response electronic message in a visual state that differs from the visual state of the remaining text in the body of the response electronic message (e.g., block 208 in FIG. 2A).

When the input indicating an intent to insert the quote is received, the process continues at block 302 where the suggested quote is removed from the response electronic message. Thus, in the illustrated embodiment, the receipt of the input indicating the intent to insert the quote acts as a rejection of the suggested quote and the non-receipt of the input functions as an acceptance of the suggested quote.

After block 302, the user can begin entering text that corresponds to the quote. As such, a text input is received at block 222. The received text input is used to automatically detect the corresponding text (the quote) in the received electronic message and the quote is inserted into the response electronic message (block 224). In one aspect, the inserted quote is presented in a first visual state that differs from the other text in the response electronic message, although this is not required.

In some embodiments, the one or more characters or special characters that was entered into the body of the response electronic message to indicate the intent to insert a quote can be removed from the response electronic message, leaving just the inserted quote (e.g., bock 226 in FIG. 2). Additionally, the suggested quote, the acceptance or rejection of the suggested quote, and/or the text input and the corresponding quote can optionally be added to the training data for the one or more ML algorithms (block 228).

Figure 4:
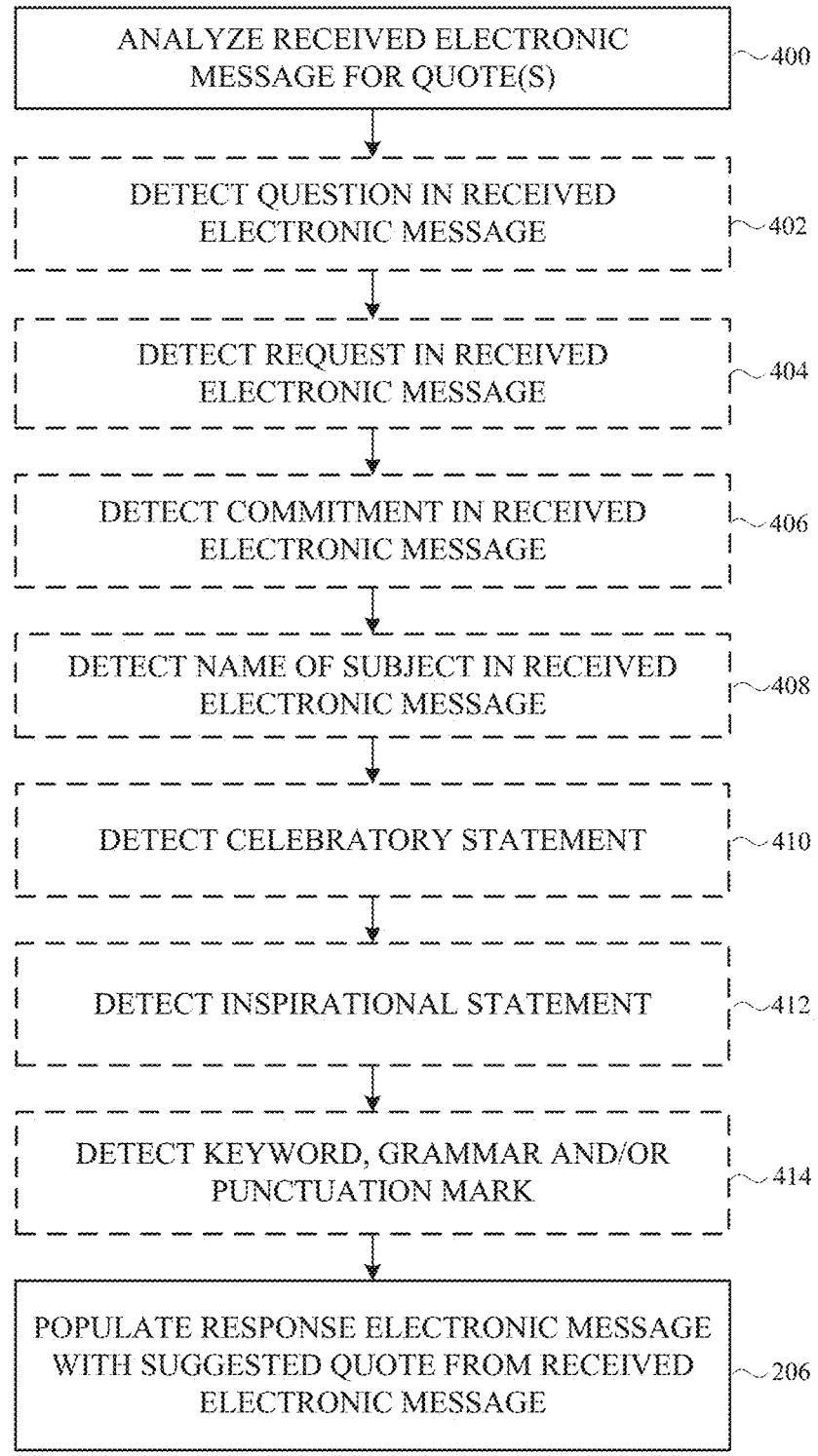
FIG. 4 depicts a flowchart of an example method of detecting a quote in an electronic message.

FIG. 4 depicts a flowchart of an example method of detecting one or more quotes in an electronic message. The process shown in FIG. 4 can be performed at block 204 in FIG. 2. Initially, the received electronic message is analyzed at block 400 to detect one or more quotes. In one embodiment, the received electronic message is analyzed using one or more ML algorithms and/or one or more rule-based ML algorithms. The one or more quotes may be detecting using one or more of the operations shown in blocks 402, 404, 406, 408, 410, 412, and 414. When the process is performed, one or more of the blocks in FIG. 4 is executed to detect a quote or quotes. For example, blocks 402 and 406 may be performed while blocks 404, 408, 410, 412, and 414 are not executed. In other embodiments, additional or different operations can be performed to detect a quote.

A suggested quote or suggested quotes may be detected based on detecting one or more questions in the received electronic message (block 402). Additionally or alternatively, one or more requests and/or one or more commitments may be detected in the received electronic message (blocks 404, 406). For example, the request can instruct the recipient of the received electronic message to perform a task. A commitment may inform the recipient that the sender of the received electronic message will perform a task.

In some instances, one or more names of a subject can be detected in the received electronic message (block 408). In a non-limiting example, the name of the recipient, the name of a document, the name of a project, the name of a team, the name of a building or a location (e.g., park, airport), and/or the name of a city can be detected. The text surrounding the name may be used to determine if the text forms a suggested quote. Additionally or alternatively, one or more celebratory statements and/or one or more inspirational statements can be detected in the received electronic message (blocks 410, 412). For example, a celebratory statement can celebrate or commemorate an event, a person or a team, or an achievement, and an inspirational statement can provide encouragement or motivation to the recipient or another user.

One or more keywords, punctuation marks and/or grammar in the received electronic message may be detected at block 414. For example, a question mark or exclamation mark can be detected. Additionally or alternatively, keyword such as "can", "when", "trip", a project name, a department, a company, and the like can be detected in the received electronic message. After detecting the one or more suggested quotes in the received electronic message, the response electronic message is automatically populated with the suggested quote(s) (block 206).

As described earlier, one or more ML algorithms and/or one or more rule-based ML algorithms can be used to detect a quote in a received electronic message. In a non-limiting example, one or more ML algorithms can be used in blocks 400, 402, 404, 406, 408, and 410 and one or more rule-based ML algorithms may be used in block 412.

Figure 5:
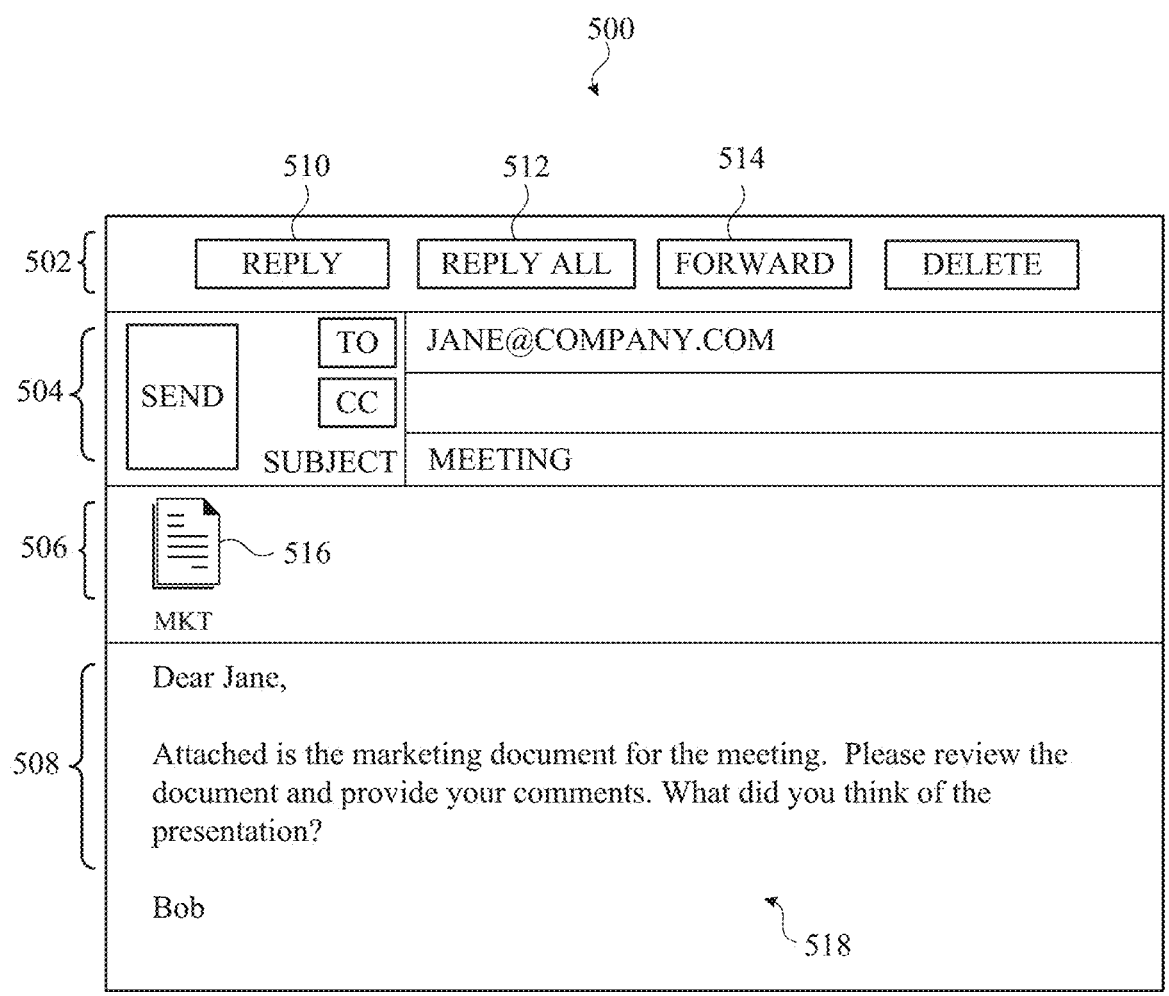
FIG. 5 illustrates an example electronic message that is received by a recipient.

FIG. 5 illustrates an example electronic message that is received by a recipient. The electronic message is depicted as an electronic mail message 500, although embodiments are not limited to this type of electronic message. The electronic mail message 500 includes a menu section 502, a header section 504, an optional attachment section 506, and a body section 508. The menu section 502 can include one or more menu options, such as new electronic mail message, delete, reply 510, reply all 512, and forward 514. In one embodiment, the process of populating a response electronic mail message with one or more quotes is performed when a user selects the reply 510, reply all 512, or forward 514 menu options.

The header section 504 includes one or more address fields for recipient addresses. The fields can include "TO", "CC", and "BCC" fields. In the representative electronic mail message 500, the electronic mail message 500 is to be sent to the recipient Jane (see TO address field).

The header section 504 further includes a subject field and a "SEND" action. The optional attachment section 506 presents the attachments to the electronic mail message 500. In the illustrated embodiment, a document entitled "MKT" 516 is attached to the electronic mail message 500.

The body section 508 contains the message 518 for the recipient(s). In FIG. 5, the message 518 includes a request ("Please review the document and provide your comments.") and a question ("What did you think of the presentation?"). The sender selects the "SEND" action in the header section 504 to send the electronic mail message 500 to the recipient Jane.

Figure 6A:
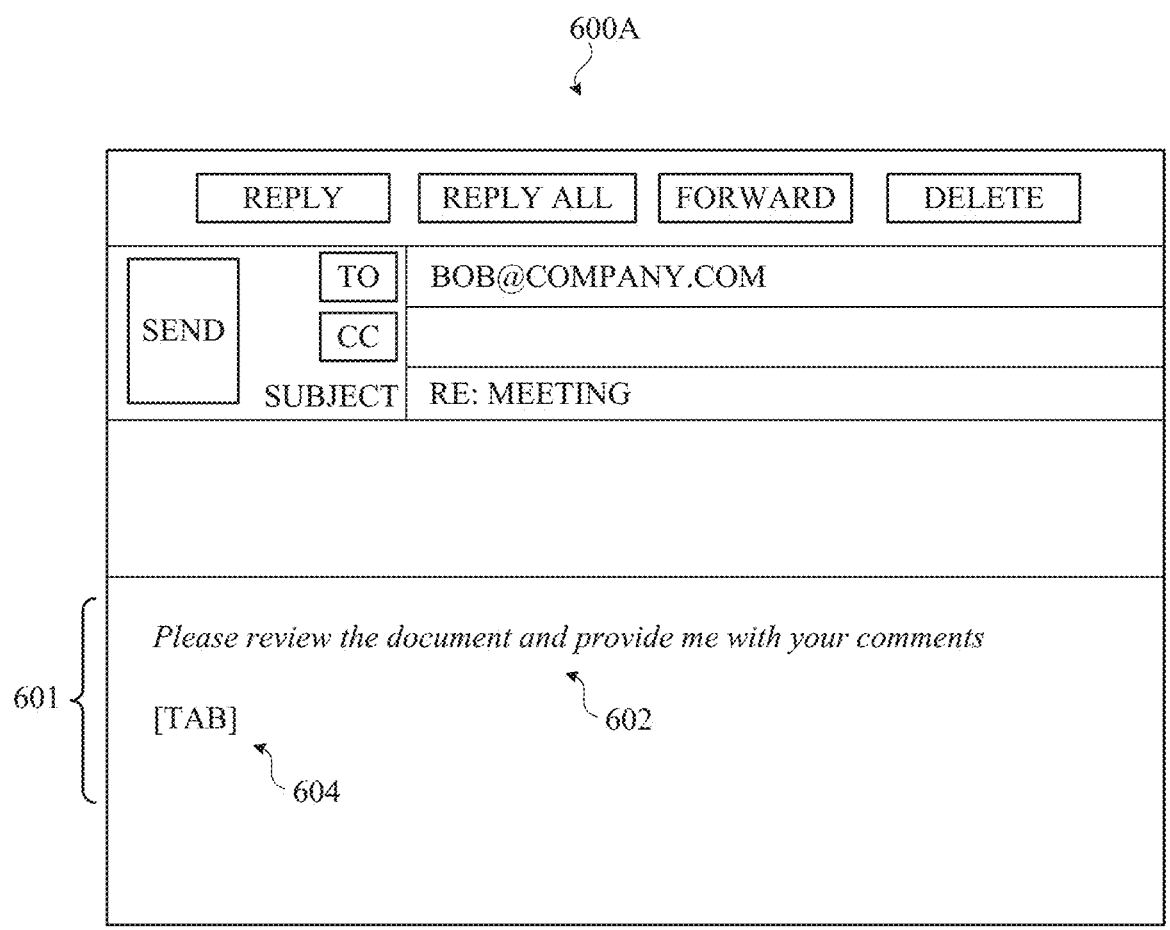
FIG. 6A depicts a first example response electronic mail message that is populated with a suggested quote.

FIG. 6A depicts a first example response electronic mail message that is populated with a suggested quote. In the illustrated embodiment, Jane is responding to the electronic mail message 500 shown in FIG. 5. The response electronic mail message 600A in FIG. 6A is generated in response to Jane selecting the "REPLY" menu option 510 in the received electronic mail message 500. The body section 601 of the response electronic mail message 600A is automatically populated with a suggested quote 602 obtained from the received electronic mail message (500 in FIG. 5). The suggested quote 602 is presented in a first visual state (represented by italicized text). Jane accepts the suggested quote 602 by submitting an acceptance input 604. The acceptance input 604 is represented by a selection of the TAB keyboard key in FIG. 6A.

Figure 6B:
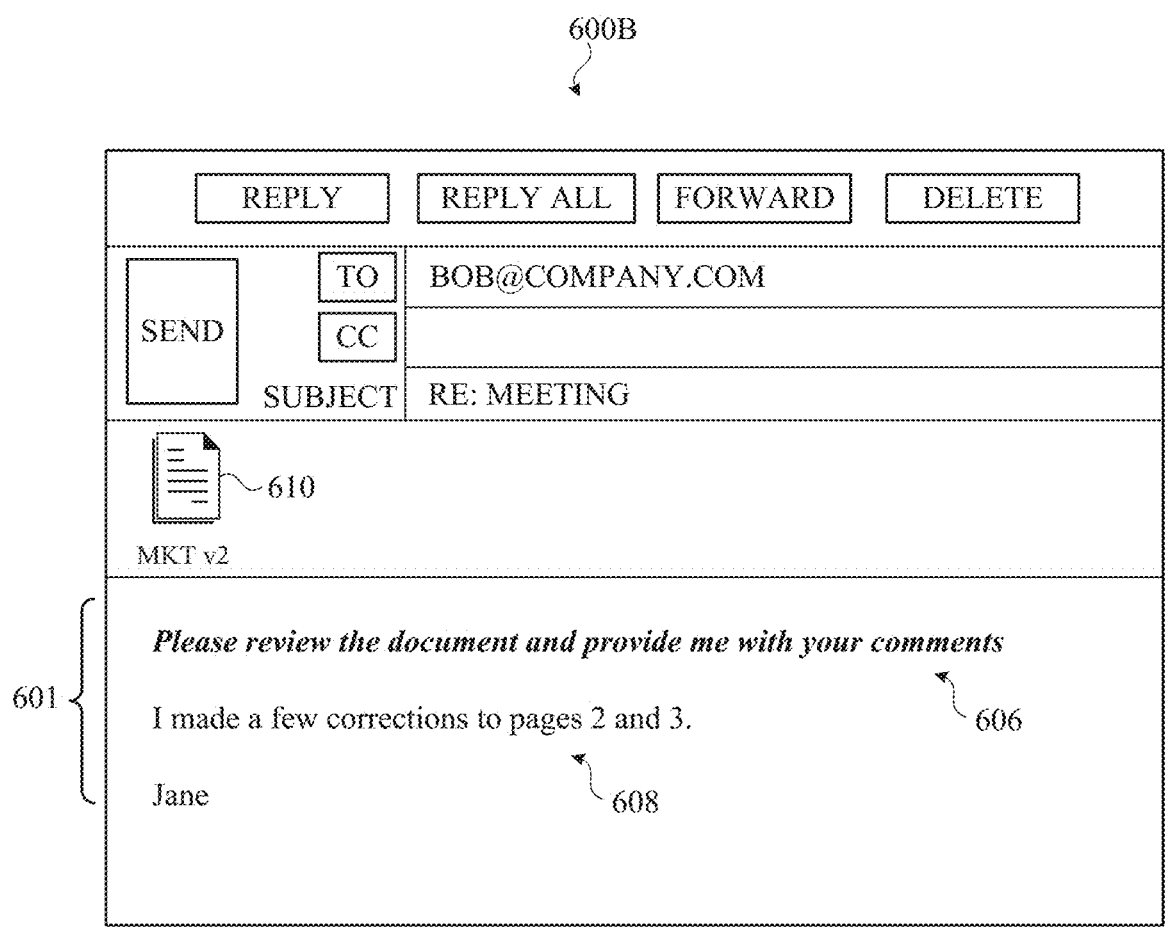
FIG. 6B illustrates the first example response electronic mail message populated with a finalized quote.

FIG. 6B illustrates the first example response electronic mail message populated with a finalized quote. In response to the receipt of the acceptance input 604, the suggested quote 602 is finalized in the response electronic mail message 600B. The finalized quote 606 can be presented in a different second visual state (represented by bolded italicized text). Jane enters a message 608 for Bob in the body section 601 that corresponds to the finalized quote 606. Jane has also attached a revised MKT document 610 (MKT v2) to the response electronic mail message 600B. Jane selects the "SEND" action to send the electronic mail message 600B to Bob.

Figure 7A:
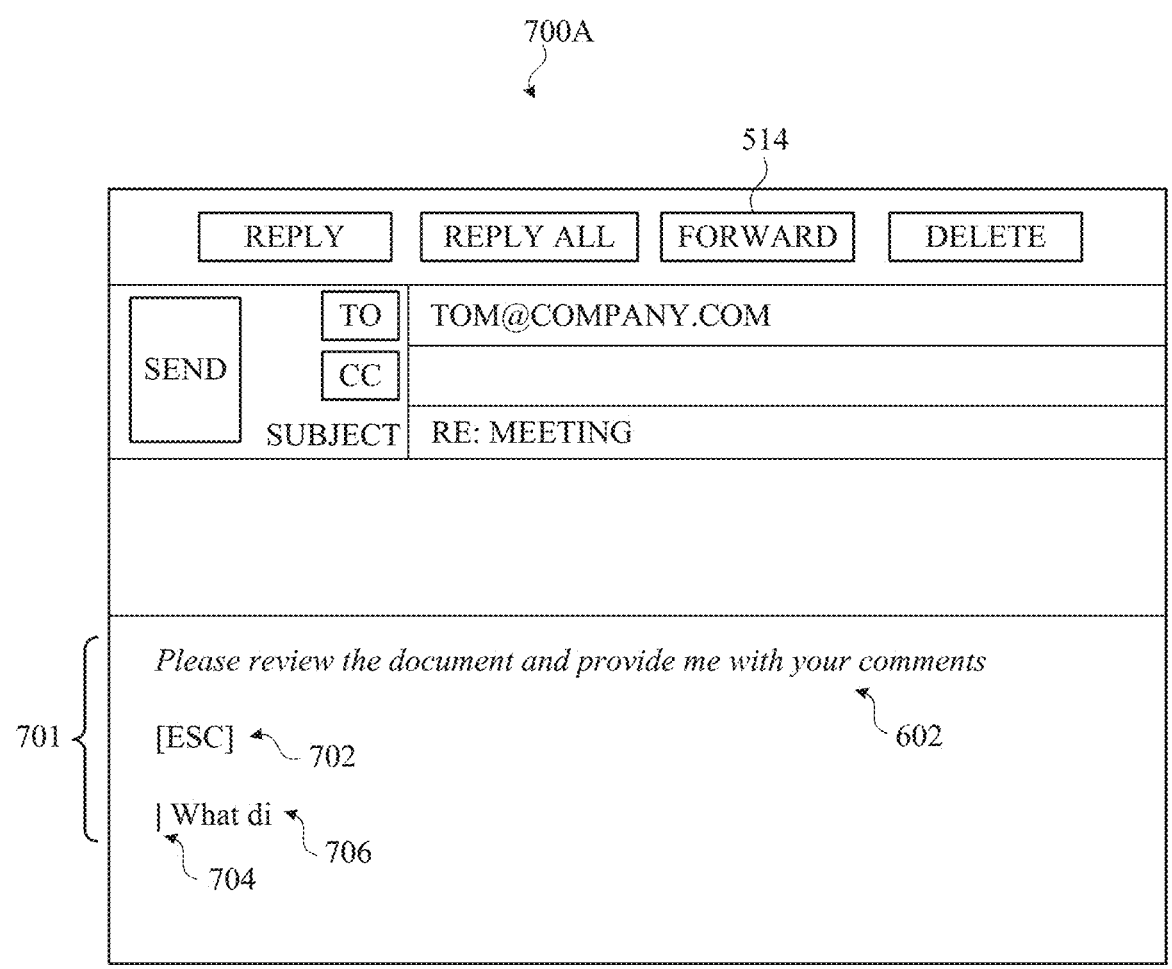
FIG. 7A depicts a second example response electronic mail message that is populated with a suggested quote.

FIG. 7A illustrates a second example response electronic mail message that is populated with a suggested quote. In the representative embodiment, Jane is responding to the electronic mail message 500 shown in FIG. 5. The response electronic mail message 700A in FIG. 7A is generated in response to Jane selecting the "FORWARD" menu option 514 in the received electronic mail message 500. The body section 701 of the response electronic mail message 700A is automatically populated with a suggested quote 602 obtained from the received electronic message (500 in FIG. 5). The suggested quote 602 is presented in a first visual state (represented by italicized text).

Jane rejects the suggested quote 602 by submitting a rejection input 702. The rejection input 702 is represented by a selection of the ESC keyboard key in FIG. 7A. After Jane submits the ESC keyboard key, Jane enters a quote input 704 to indicate her intention to insert a quote into the response electronic mail message 700B and begins entering the text 706 from the quote.

FIG. 7B illustrates the second example response electronic mail message populated with an inserted quote. In response to the receipt of the quote input 704 and the text input 706, the suggested quote 602 is removed from the response electronic mail message 700B. Additionally, based on the text input 706, the intended quote 708 is determined in the received electronic mail message (500 in FIG. 5) and inserted into the response electronic mail message 700B. The inserted quote 708 may be presented in a different second visual state (represented by bolded italicized text). Jane enters a message 710 for Tom in the body section 701 that corresponds to the inserted quote 708. Jane selects the "SEND" action to send the electronic mail message 700B to Tom.

As discussed in conjunction with FIG. 2, multiple suggested quotes can be detected in a received electronic message. FIG. 8A depicts an example first response electronic mail message populated with multiple finalized and/or inserted quotes. The finalized and/or inserted quotes can be included in the first response electronic mail message 800A using the embodiments disclosed herein.

In the illustrated embodiment, the first response electronic mail message 800A is generated in response to the recipient selecting the "REPLY" menu selection in a received electronic mail message (not shown). The first response electronic mail message 800A is populated with three finalized quotes 802, 804, 806. Other embodiments can populate the first response electronic mail message with two or more finalized quotes. The finalized quotes 802, 804, 806 are presented in a first visual state, as indicated by the bullet points 808 and the bold italicized text.

FIG. 8B illustrates an example second response electronic mail message to the first response electronic mail message shown in FIG. 8A. The second response electronic mail message 800B is generated in response to the recipient selecting the "REPLY" menu selection in the first response electronic mail message 800A. Reply messages 810, 812, 814 are provided in the second response electronic mail message 800B. In the illustrated embodiment, "Bob" entered each reply message 810, 812, 814 inline with, or immediately following, the finalized quotes. The reply messages 810, 812, 814 can be entered at different locations in other embodiments. Additionally, suggested and/or finalized quotes can be included in a single response electronic message or in a series of response electronic messages (e.g., a message thread).

As an alternative to automatically populating a response electronic message with multiple suggested quotes, a user can select which suggested quote or quotes the user wants to include in the response electronic message. The multiple suggested quotes may relate to the same subject and/or to different subjects.

Figure 9:
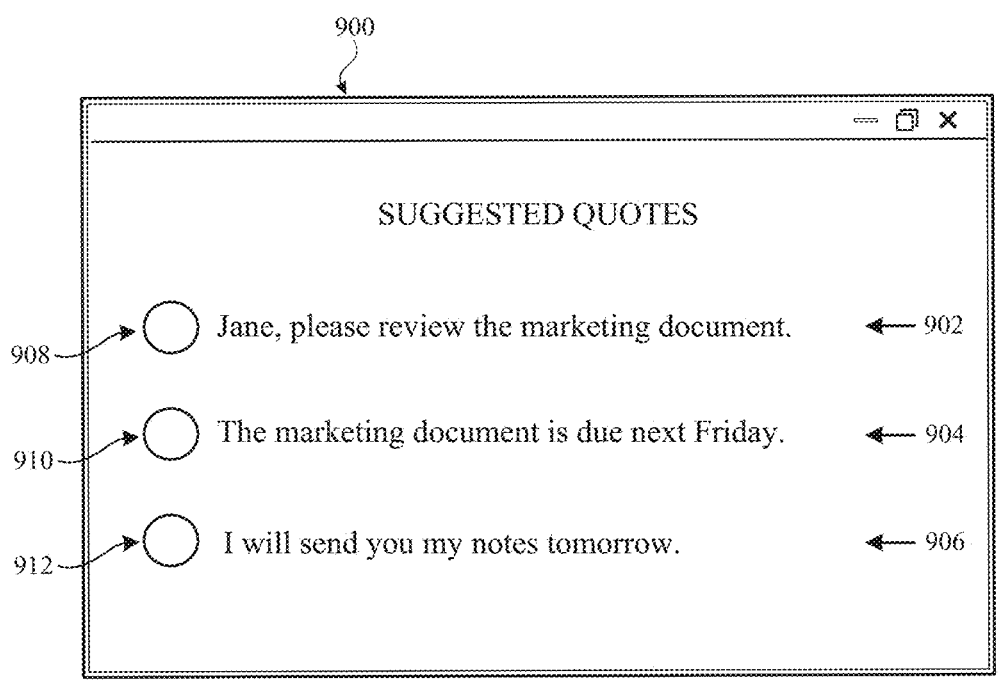
FIG. 9 depicts an example user interface that can be used to present multiple suggested quotes to a user.

FIG. 9 depicts an example user interface that can be used to present multiple suggested quotes to a user. FIG. 9 is described in conjunction with the electronic message 500 shown in FIG. 5. The user interface 900 lists three suggested quotes 902, 904, 906. The suggested quotes 902, 904 relate to the same subject, which is the marketing document. The suggested quotes 902, 904 may be detected as suggested quotes based at least on the detection of the recipient's name (Jane), the document name, and/or the name of the day or deadline (Friday). The suggested quote 906 may be detected as a suggested quote based at least on the detection of the word "will" (future tense) and/or the deadline (tomorrow).

Displayed adjacent to each suggested quote, and associated with the suggested quote, is a radio button 908, 910, 912 that enable a user (e.g., the recipient) to select one or more of the suggested quotes. Based on the selection of one or more suggested quotes, the selected quotes are inserted into a response electronic message. Although radio buttons are shown in FIG. 9, other embodiments are not limited to this configuration. Other user interface selection controls can be used, such as, for example, a drop-down menu, checkboxes, and switches. In some instances, the system can be configured to receive an audio response (e.g., a verbal input from the user) or text response that selects one of the options.

Figure 10:
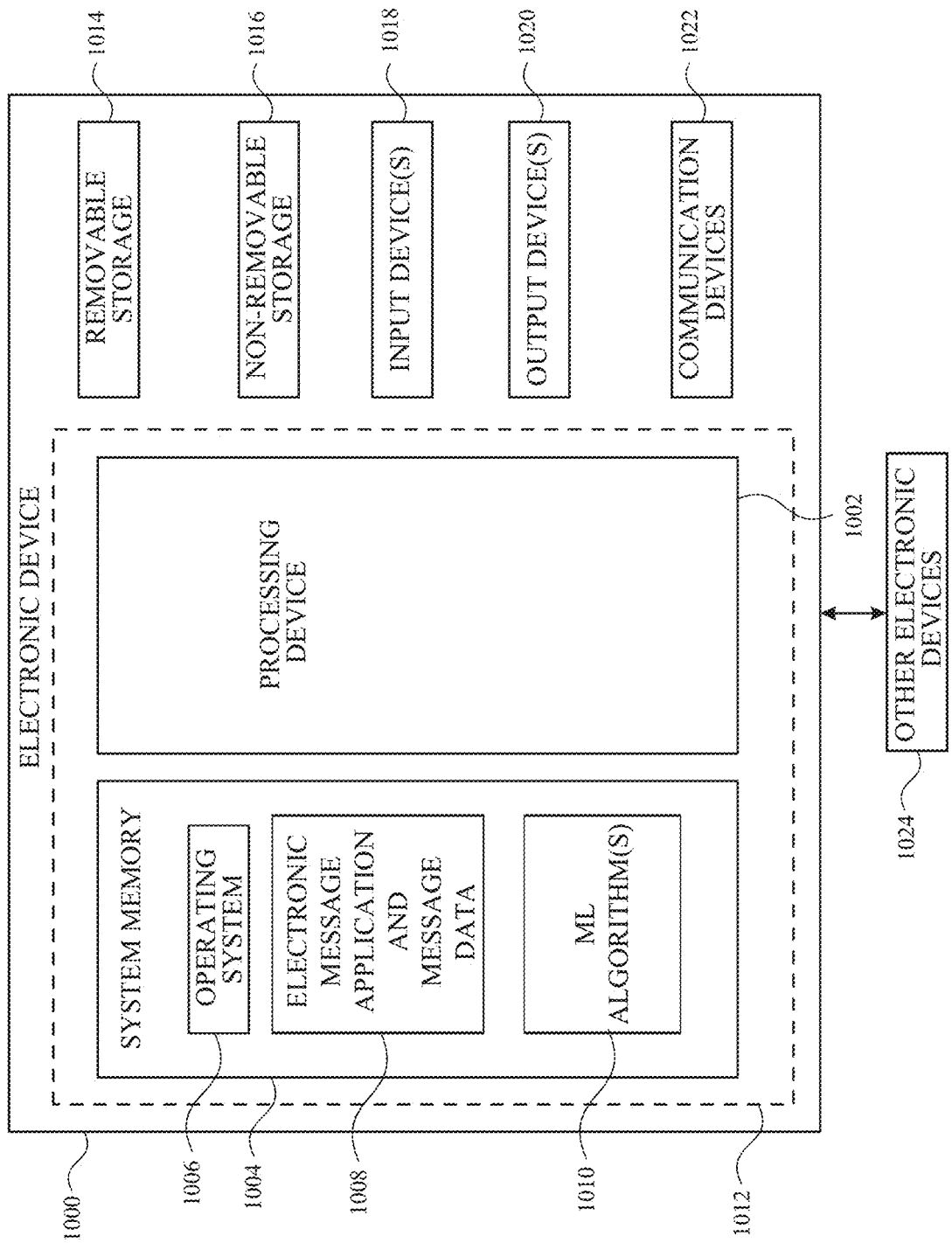
FIG. 10 is a block diagram depicting example physical components of a computing device with which aspects of the disclosure may be practiced.
Figure 11A:
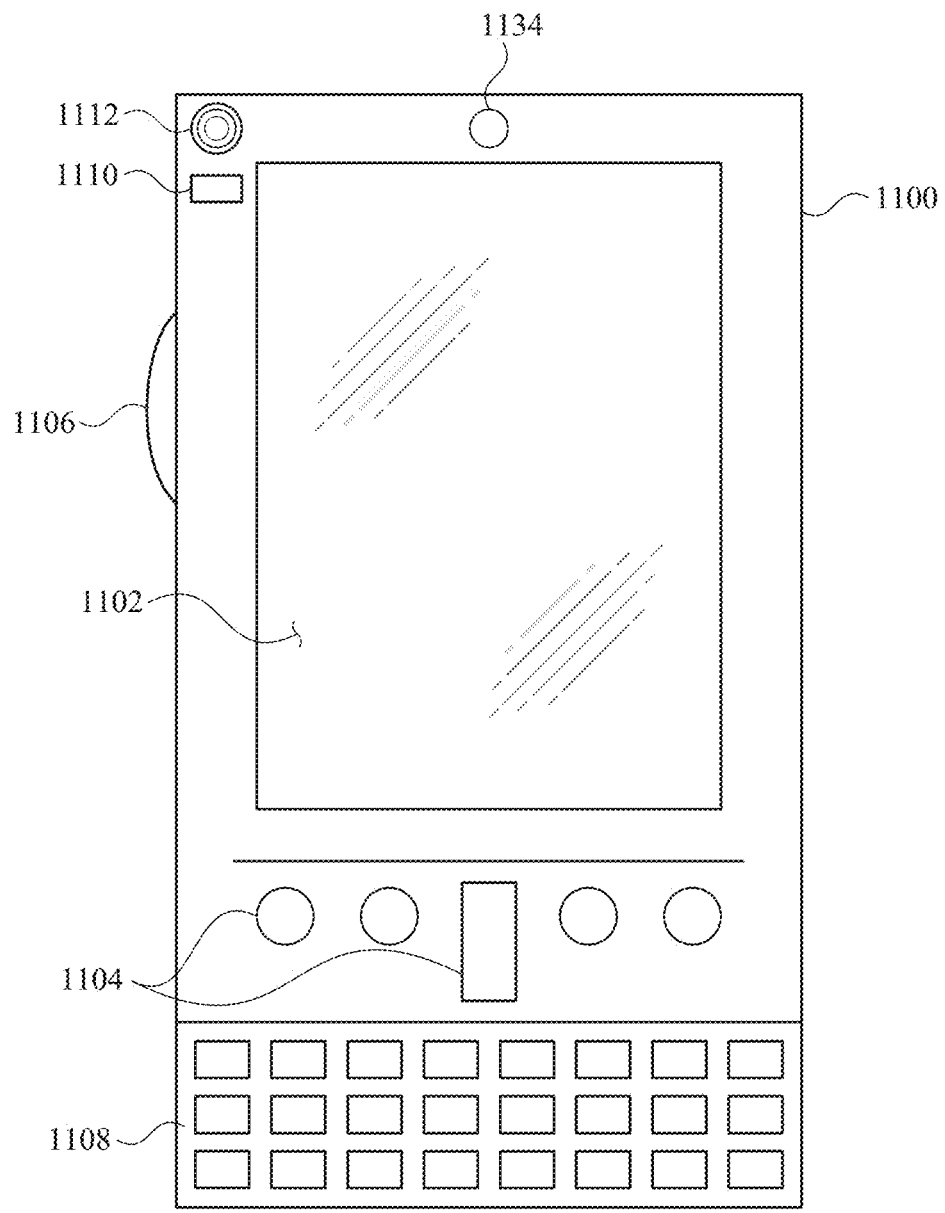
FIGS. 11A-11B are simplified block diagrams illustrating a mobile computing device with which aspects of the present disclosure may be practiced.
Figure 11B:
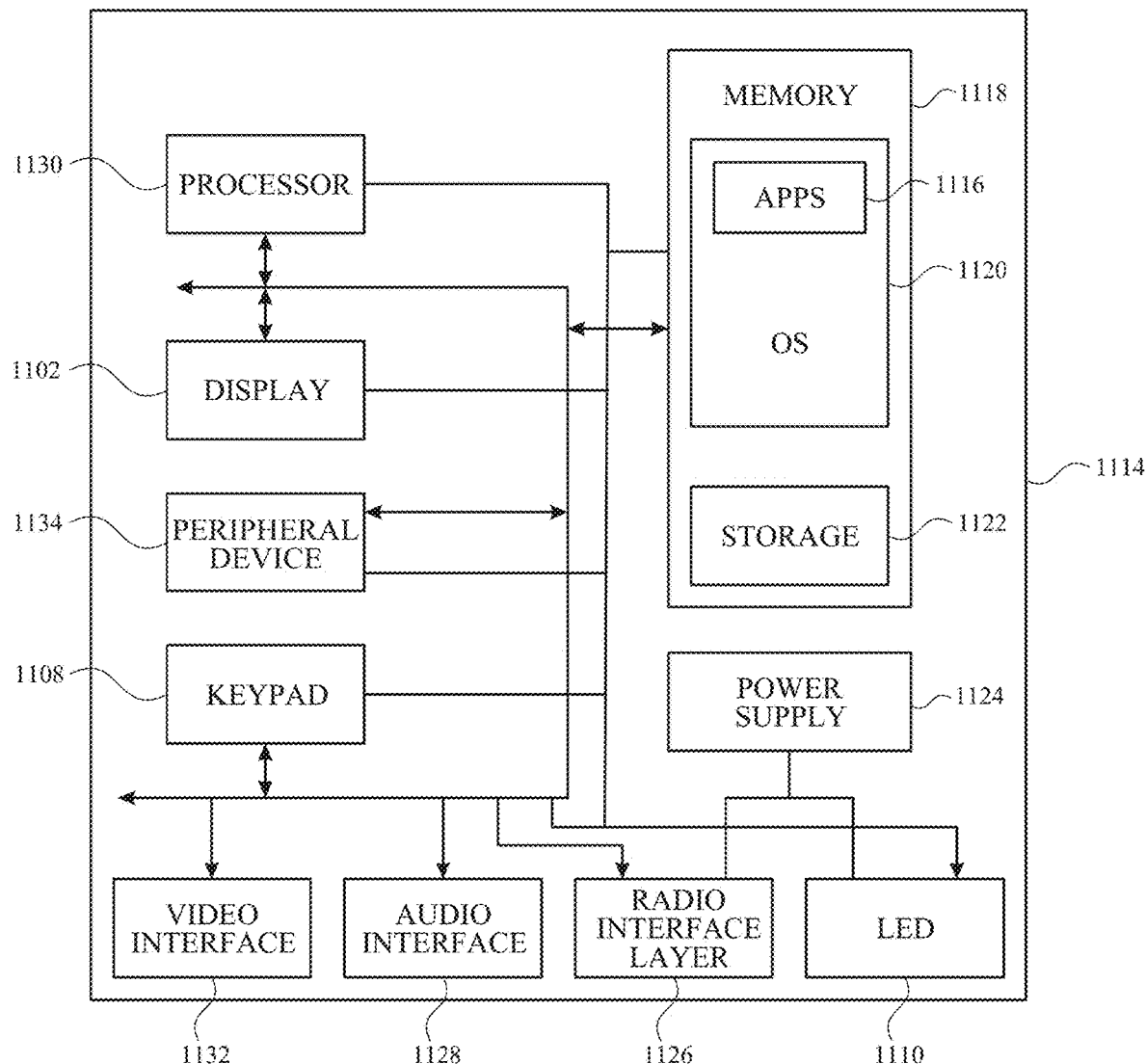
Figure 12:
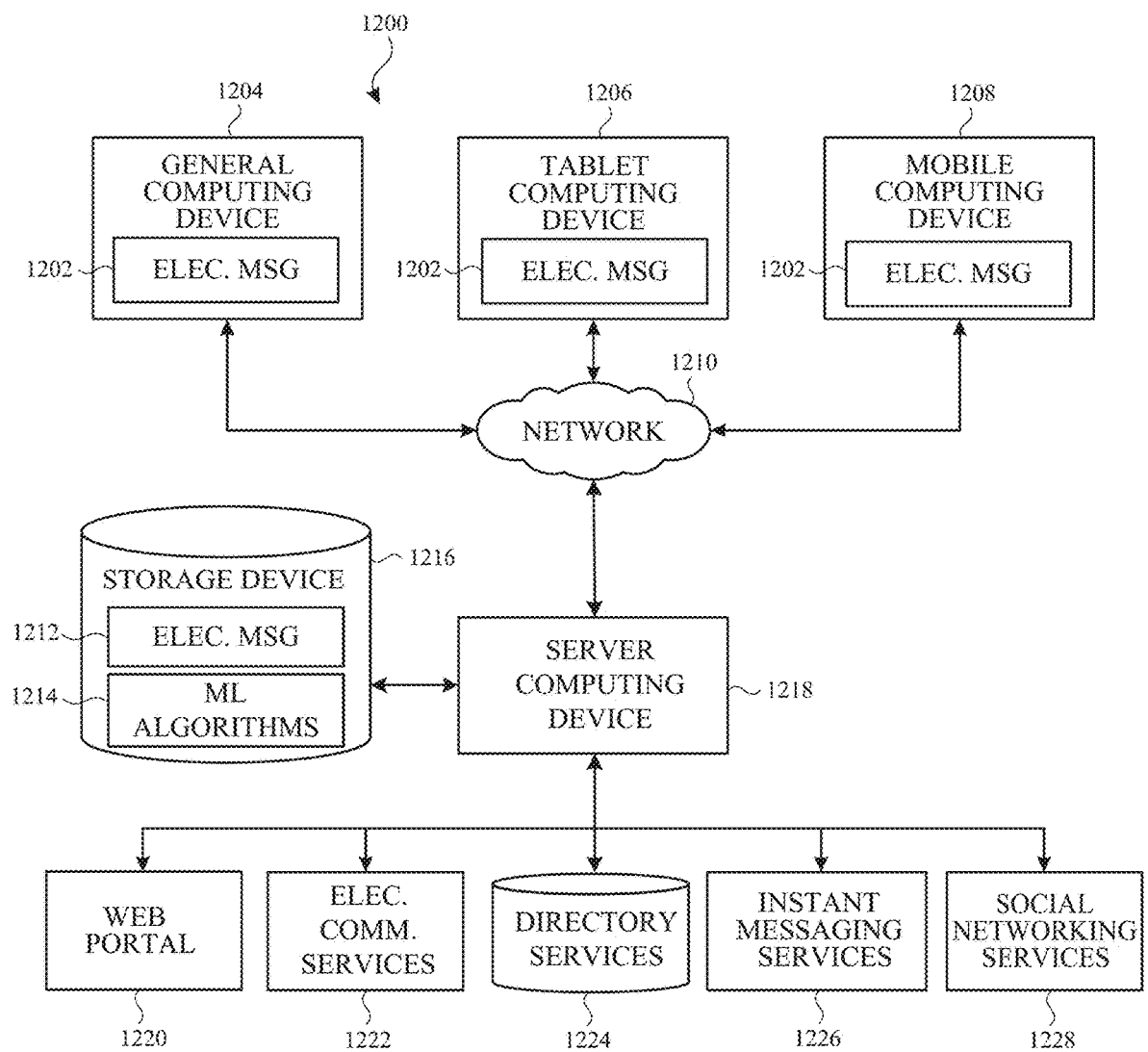
FIG. 12 is a block diagram depicting a distributed computing system in which aspects of the present disclosure may be practiced.

FIGS. 10-12 and the associated descriptions provide a discussion of a variety of operating environments in which aspects of the disclosure may be practiced. However, the devices and systems illustrated and discussed with respect to FIGS. 10-12 are for purposes of example and illustration and are not limiting of a vast number of electronic device configurations that may be utilized for practicing aspects of the disclosure, as described herein.

FIG. 10 is a block diagram illustrating physical components (e.g., hardware) of an electronic device 1000 with which aspects of the disclosure may be practiced. In a basic configuration, the electronic device 1000 may include at least one processing device 1002 and a system memory 1004. Any suitable processing device 1002 can be used. For example, the processing device 1002 may be a central processing unit, a microprocessor, an application specific integrated circuit, a graphics processing unit, a field programmable gate array, or combinations thereof.

Depending on the configuration and type of the electronic device 1000, the system memory 1004 may comprise, but is not limited to, volatile storage (e.g., random access memory), non-volatile storage (e.g., read-only memory), flash memory, or any combination of such memories. The system memory 1004 may include a number of program modules and data files, such as an operating system 1006, one or more electronic message applications and associated message data (represented by electronic message application and message data 1008), and one or more ML algorithms and/or one or more rule-based ML algorithms 1010. While executing on the processing device 1002, the algorithm(s) 1010 may perform and/or cause to be performed processes including, but not limited to, the aspects as described herein.

The operating system 1006, for example, may be suitable for controlling the operation of the electronic device 1000. Furthermore, embodiments of the disclosure may be practiced in conjunction with a graphics library, other operating systems, or any other application program and is not limited to any particular application or system. This basic configuration is illustrated in FIG. 10 by those components within a dashed line 1012.

The electronic device 1000 may have additional features or functionality. For example, the electronic device 1000 may also include additional data storage devices (removable and/or non-removable) such as, for example, magnetic disks, optical disks, or tape. Such additional storage is illustrated in FIG. 10 by a removable storage device 1014 and a non-removable storage device 1016. The electronic device 1000 may also have one or more input device(s) 1018 such as a keyboard, a trackpad, a mouse, a pen, a sound or voice input device, a touch, force and/or swipe input device, etc. The output device(s) 1020 such as a display, speakers, a printer, etc. may also be included. The aforementioned devices are examples and others may be used.

The electronic device 1000 may include one or more communication devices 1022 allowing communications with other electronic devices 1024. Examples of suitable communication devices 1022 include, but are not limited to, radio frequency (RF) transmitter, receiver, and/or transceiver circuitry; universal serial bus (USB), parallel, and/or serial ports.

The term computer-readable media as used herein may include computer storage media. Computer storage media may include volatile and nonvolatile, removable and non-removable media implemented in any method or technology for storage of information, such as computer readable instructions, data structures, or program modules.

The system memory 1004, the removable storage device 1014, and the non-removable storage device 1016 are all computer-readable storage media examples (e.g., storage device). The computer-readable storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the electronic device 1000. Any such computer-readable storage media may be part of the electronic device 1000. Computer-readable storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit.

When operating via an SOC, the functionality, described herein, with respect to the capability of client to switch protocols may be operated via application-specific logic integrated with other components of the electronic device 1000 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

FIGS. 11A and 11B illustrate a mobile electronic device 1100, for example, a mobile telephone, a smart phone, wearable computer (such as a smart watch), a tablet computer, a laptop computer, and the like, with which embodiments of the disclosure may be practiced. With reference to FIG. 11A, one aspect of a mobile electronic device 1100 for implementing the aspects described herein is illustrated.

In a basic configuration, the mobile electronic device 1100 is a handheld computer having both input elements and output elements. The mobile electronic device 1100 typically includes a display 1102 and one or more input buttons 1104 that allow the user to enter information into the mobile electronic device 1100. The display 1102 of the mobile electronic device 1100 may also function as an input device (e.g., a display that accepts touch and/or force input).

If included, an optional side input element 1106 allows further user input. The side input element 1106 may be a rotary switch, a button, or any other type of manual input element. In alternative aspects, mobile electronic device 1100 may incorporate more or less input elements. For example, the display 1102 may not be a touch screen in some embodiments. In yet another alternative embodiment, the mobile electronic device 1100 is a portable phone system, such as a cellular phone. The mobile electronic device 1100 may also include an optional keypad 1108. Optional keypad 1108 may be a physical keypad or a "soft" keypad generated on the touch screen display.

In various embodiments, the output elements include the display 1102 for showing a graphical user interface (GUI) of an electronic communication or message application, a visual indicator 1110 (e.g., a light emitting diode), and/or an audio transducer 1112 (e.g., a speaker). In some aspects, the mobile electronic device 1100 incorporates a vibration transducer for providing the user with tactile feedback. In yet another aspect, the mobile electronic device 1100 incorporates input and/or output ports, such as an audio input (e.g., a microphone jack), an audio output (e.g., a headphone jack), and a video output (e.g., a HDMI port) for sending signals to or receiving signals from an external device.

FIG. 11B is a block diagram illustrating the architecture of one aspect of a mobile electronic device 1100. That is, the mobile electronic device 1100 can incorporate a system (e.g., an architecture) 1114 to implement some aspects. In one embodiment, the system 1114 is implemented as a "smart phone" capable of running one or more applications (e.g., browser, electronic messages, calendaring, contact managers, messaging clients, games, media clients/players, diagramming, and sharing applications and so on). In some aspects, the system 1114 is integrated as an electronic device, such as an integrated personal digital assistant (PDA) and wireless phone.

One or more application programs 1116 may be loaded into the memory 1118 and run on or in association with the operating system 1120. Examples of the application programs include phone dialer programs, electronic message applications, word processing programs, spreadsheet programs, Internet browser programs, and so forth.

The system 1114 also includes a non-volatile storage area 1122 within the memory 1118. The non-volatile storage area 1122 may be used to store persistent information that should not be lost when the system 1114 is powered down.

The application programs 1116 may use and store information in the non-volatile storage area 1122, such as electronic messages, attachments or other messages used by an electronic message application, and the like. A synchronization application (not shown) also resides on the system 1114 and is programmed to interact with a corresponding synchronization application resident on a host computer to keep the information stored in the non-volatile storage area 1122 synchronized with corresponding information stored at the host computer.

The system 1114 has a power supply 1124, which may be implemented as one or more batteries. The power supply 1124 may further include an external power source, such as an AC adapter or a powered docking cradle that supplements or recharges the batteries.

The system 1114 may also include a radio interface layer 1126 that performs the function of transmitting and receiving radio frequency communications. The radio interface layer 1126 facilitates wireless connectivity between the system 1114 and the "outside world," via a communications carrier or service provider. Transmissions to and from the radio interface layer 1126 are conducted under control of the operating system 1120. In other words, communications received by the radio interface layer 1126 may be disseminated to the application programs 1116 via the operating system 1120, and vice versa.

The visual indicator 1110 may be used to provide visual notifications, and/or an audio interface 1128 may be used for producing audible notifications via an audio transducer (e.g., audio transducer 1112 illustrated in FIG. 11A). In the illustrated embodiment, the visual indicator 1110 is a light emitting diode (LED) and the audio transducer 1112 may be a speaker. These devices may be directly coupled to the power supply 1124 so that when activated, they remain on for a duration dictated by the notification mechanism even though the processor 1130 and other components might shut down for conserving battery power. The LED may be programmed to remain on indefinitely until the user takes action to indicate the powered-on status of the device. The audio interface 1128 is used to provide audible signals to and receive audible signals from the user (e.g., voice input such as described above). For example, in addition to being coupled to the audio transducer 1112, the audio interface 1128 may also be coupled to a microphone to receive audible input, such as to facilitate a telephone conversation. In accordance with embodiments of the present disclosure, the microphone may also serve as an audio sensor to facilitate control of notifications, as will be described below.

The system 1114 may further include a video interface 1132 that enables an operation of peripheral device 1134 (e.g., on-board camera) to record still images, video stream, and the like.

A mobile electronic device 1100 implementing the system 1114 may have additional features or functionality. For example, the mobile electronic device 1100 may also include additional data storage devices (removable and/or non-removable) such as, magnetic disks, optical disks, or tape. Such additional storage is illustrated in FIG. 11B by the non-volatile storage area 1122.

Data/information generated or captured by the mobile electronic device 1100 and stored via the system 1114 may be stored locally on the mobile electronic device 1100, as described above, or the data may be stored on any number of storage media that may be accessed by the device via the radio interface layer 1126 or via a wired connection between the mobile electronic device 1100 and a separate electronic device associated with the mobile electronic device 1100, for example, a server computing device in a distributed computing network, such as the Internet (e.g., server computing device 1118 in FIG. 11). As should be appreciated such data/information may be accessed via the mobile electronic device 1100 via the radio interface layer 1126 or via a distributed computing network. Similarly, such data/information may be readily transferred between electronic devices for storage and use according to well-known data/information transfer and storage means, including electronic mail and collaborative data/information sharing systems.

As should be appreciated, FIG. 11A and FIG. 11B are described for purposes of illustrating the present methods and systems and is not intended to limit the disclosure to a particular sequence of steps or a particular combination of hardware or software components.

FIG. 12 is a block diagram illustrating a distributed system in which aspects of the disclosure may be practiced. The system includes one or more electronic message applications 1202 in a general computing device 1204 (e.g., a desktop computer), a tablet computing device 1206, and/or a mobile computing device 1208. The general computing device 1204, the tablet computing device 1206, and the mobile computing device 1208 can each include the components, or be connected to the components, that are shown associated with the electronic device 1000 in FIG. 10 or the mobile electronic device 1100 in FIGS. 11A-11B.

The general computing device 1204, the tablet computing device 1206, and the mobile computing device 1208 are each configured to access one or more networks (represented by network 1210) to interact with one or more electronic message applications 1212 stored in one or more storage devices (represented by storage device 1216) and executed on one or more server computing devices (represented by server computing device 1218). One or more ML algorithms and/or one or more rule-based ML algorithms 1214 can be stored in the storage device 1216 and executed on the server computing device 1218. As described previously, the ML algorithm(s) and/or the rule-based ML algorithm(s) 1214 are used to detect and populate a response electronic message with one or more quotes.

In some aspects, the server computing device 1218 can access and/or receive various types of services, communications, documents and information transmitted from other sources, such as a web portal 1220, an electronic communications services 1222, directory services 1224, instant messaging and/or text services 1226, and/or social networking services 1228. In some instances, these sources may provide robust reporting, analytics, data compilation and/or storage service, etc., whereas other services may provide search engines or other access to data and information, images, graphics, videos, document processing and the like.

As should be appreciated, FIG. 12 is described for purposes of illustrating the present methods and systems and is not intended to limit the disclosure to a particular sequence of steps or a particular combination of hardware or software components.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternative aspects falling within the spirit of the broader aspects of the general inventive concept embodied in this application that do not depart from the broader scope of the claimed disclosure.

The invention claimed is:

1. A computer-implemented method of populating a response electronic message with a quote from a received electronic message, the method comprising:
   receiving an indication to send the response electronic message to the received electronic message;
   automatically detecting quotable text in the received electronic message;
   populating the response electronic message with the quotable text, the quotable text presented as a suggested quote; and
   based on a received input associated with the suggested quote, determining whether to finalize or remove the suggested quote in the response electronic message.

2. The computer-implemented method of claim 1, wherein the quotable text relates to a recipient of the received electronic message performing a task in response to the received electronic message, and the method further comprises determining to finalize the suggested quote in the response electronic message.

3. The method of claim 2, wherein the quote finalized in the response electronic message is presented in a first visual state and remaining text in the response electronic message is presented in a different second visual state.

4. The method of claim 2, wherein the suggested quote is presented in a first visual state and the quote finalized in the response electronic message is presented in a different second visual state.

5. The computer-implemented method of claim 1, wherein:
   the received input is a rejection input; and
   the method further comprises determining to remove the suggested quote from the response electronic message.

6. The computer-implemented method of claim 1, wherein the received acceptance input comprises a first character input and the received rejection input comprises a different second character input.

7. The method of claim 1, wherein automatically detecting the quotable text in the received electronic message comprises automatically detecting, using a machine learning algorithm, a question or a name of a subject in the received electronic message.

8. The method of claim 1, wherein automatically detecting the quotable text in the received electronic message comprises automatically detecting, using a machine learning algorithm, a request or a commitment in the received electronic message.

9. The method of claim 1, wherein automatically detecting the quotable text in the received electronic message comprises automatically detecting, using a machine learning algorithm, a celebratory statement or an inspirational statement in the received electronic message.

10. The method of claim 1, wherein automatically detecting the quotable text in the received electronic message comprises automatically detecting, using at least one of a machine learning algorithm or rule-based machine learning, the quotable text in the received electronic message.

11. The computer-implemented method of claim 1, the method further comprising:
receiving a character input and a text input associated with an inserted quote, the character input indicating an intent to populate the response electronic message with the inserted quote obtained from the received electronic message and the text input providing at least a portion of content in the inserted quote;
based at least on the text input, determining the inserted quote in the received electronic message that corresponds to the text input;
populating the response electronic message with the inserted quote.

12. A system, comprising:
a processing device; and
a memory operably connected to the processing device and storing instructions, that when executed by the processing device, cause the system to perform operations comprising:
receiving an indication to send a response electronic message to a received electronic message;
automatically detecting quotable text in the received electronic message;
populating the response electronic message with the quotable text, the quotable text presented as a suggested quote; and
based on a received input associated with the suggested quote, determining whether to finalize or remove the suggested quote in the response electronic message.

13. The system of claim 12, wherein the quotable text relates to a recipient of the received electronic message performing a task in response to the received electronic message, and wherein the instructions, that when executed by the processing device, further cause the system to perform operations comprising: determining to finalize the suggested quote in the response electronic message when the received input is an acceptance input.

14. The system of claim 12, wherein the memory stores further instructions for determining to remove the suggested quote from the response electronic message when the received input is a rejection input.

15. The system of claim 12, wherein automatically detecting the quotable text in the received electronic message comprises automatically detecting, using the machine learning algorithm, at least one of:
a question in the received electronic message;
a commitment in the received electronic message;
a request in the received electronic message;
a name of a subject in the received electronic message;
a celebratory statement in the received electronic message; or
an inspirational statement in the received electronic message.

16. The system of claim 12, wherein the memory stores further instructions for including the suggested quote and the received acceptance input or the received rejection input to training data for the machine learning algorithm.

17. A computer-implemented method, comprising:
receiving an indication to send a response electronic message to a received electronic message; and
in response to receiving the indication:
automatically detecting quotable text in the received electronic message;
populating the response electronic message with the quotable text, the quotable text presented as a suggested quote; and
based on receiving the character input indicating an intent to populate the response electronic message with an inserted quote:
removing the suggested quote from the response electronic message;
receiving a text input that provides at least a portion of text in the received electronic message that comprises the inserted quote;
automatically determining the inserted quote in the received electronic message that corresponds to the text input; and
populating the response electronic message with the inserted quote.

18. The computer-implemented method of claim 17, wherein the quotable text relates to a recipient of the received electronic message performing a task in response to the received electronic message, and wherein automatically detecting the quotable text in the received electronic message comprises automatically detecting, using the machine learning algorithm, at least one of:
a question in the received electronic message;
a commitment in the received electronic message;
a request in the received electronic message;
a name of a subject in the received electronic message;
a celebratory statement in the received electronic message; or
an inspirational statement in the received electronic message.

19. The computer-implemented method of claim 17, further comprising causing the suggested quote and the received acceptance input or the text input and the quote to be added to training data for the machine learning algorithm.

20. The computer-implemented method of claim 17, wherein automatically detecting quotable text in the received electronic message comprises automatically detecting, using the at least the machine learning algorithm and a rule-based machine learning algorithm, quotable text in the received electronic message, the rule-based machine learning detecting at least one of a keyword, grammar, or a punctuation mark.

* * * * *